April 22, 1947.  S. C. EASTWOOD  2,419,517
CONVERSION OF HYDROCARBONS
Filed July 27, 1945
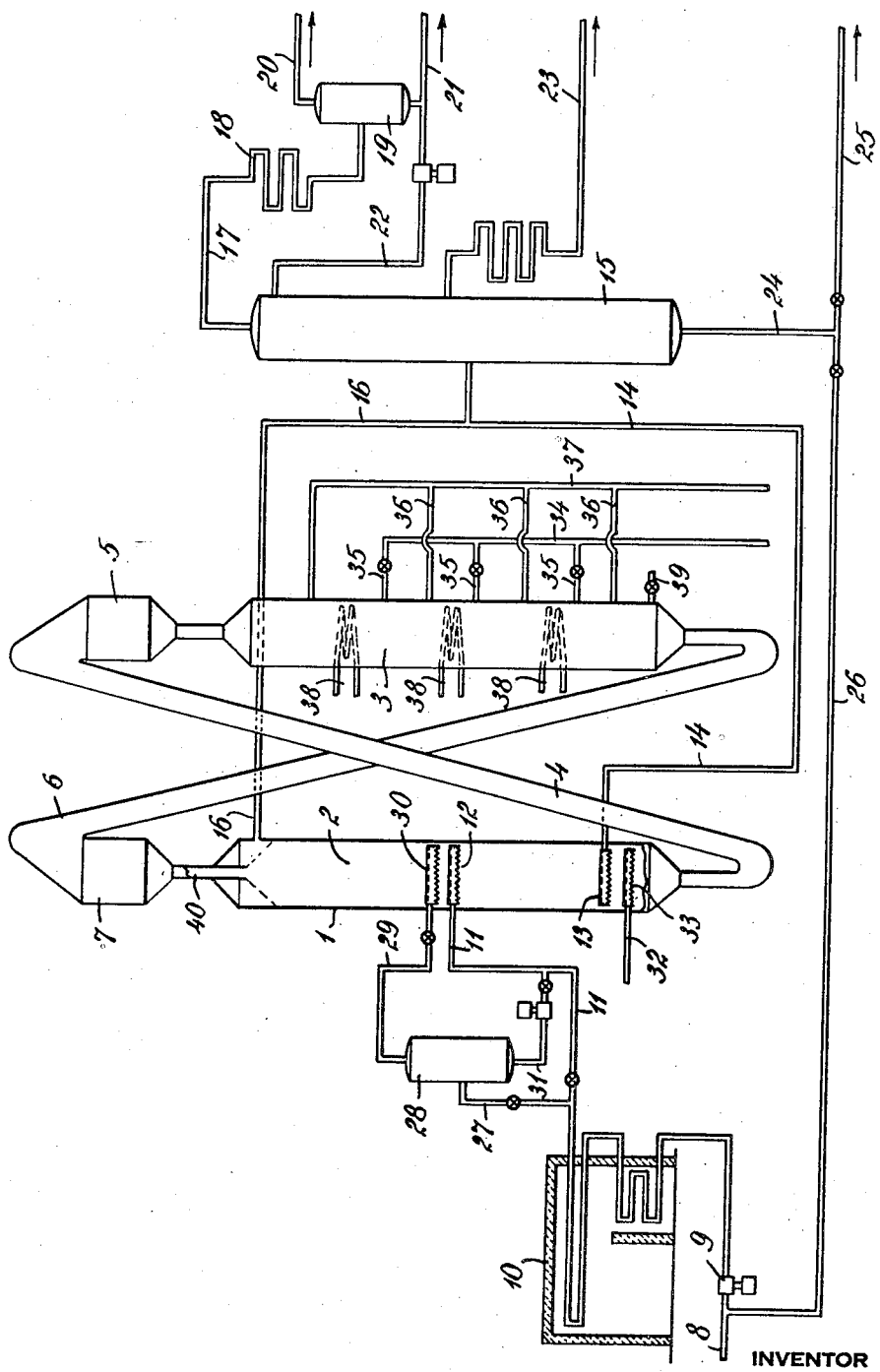
INVENTOR
SYLVANDER C. EASTWOOD
BY
ATTORNEY Patented Apr. 22, 1947

2,419,517

UNITED STATES PATENT OFFICE 2,419,517

CONVERSION OF HYDROCARBONS

Sylvander C. Eastwood, Woodbury, N. J., assignor to Socony-Vacuum Oil Company, Incorporated, a corporation of New York Application July 27, 1945, Serial No. 607,458

4 Claims. (Cl. 196—52)

This invention has to do with the conversion of petroleum hydrocarbons to gasoline of high quality in the presence of a solid contact mass. The commercial development of such process has taken three forms. The older one utilizes the contact mass in the form of a fixed bed through which vapors are passed at reaction temperature, which bed when contaminated is removed from reaction and regenerated in situ. A more recent method utilizes the contact mass in the form of quite small particles capable of being carried by and suspended in the reaction vapors and the reaction is carried out in a vessel wherein such contact material is maintained in a condition of hindered settling. Spent contact material withdrawn from this reactor is regenerated by treating with air for combustion under similar physical conditions and returned to the reactor. The third method utilizes the contact mass in particle form but in particles of larger size in the form of a moving bed or descending substantially compact column into which the hydrocarbons to be reacted are passed. Spent contact mass material discharged from the bottom of this column is passed through a similar arrangement wherein it is contacted with air for a high temperature regeneration after which it is returned to the reactor. This invention is particularly concerned with operations of this third kind.

In the cracking of heavier high boiling oils, it is often desirable to subject to cracking hydrocarbon materials having a boiling point substantially above the reaction temperature which it is desired to maintain in the reactor. Such heavy hydrocarbons are usually presented to the operation in the form of an oil having a substantial fraction boiling above the desired reaction temperature, and a fraction boiling below the reaction temperature. It has been proposed to achieve the cracking of such products in an operation of this kind by heating the oil charge to the high temperature, but not necessarily to or above the desired reaction temperature and discharging this oil in liquid form into the column of contact mass to be converted therein into products vaporous at the reaction temperature and solid materials deposited upon the contact mass. The products vaporous at the reaction temperature will comprise of course gasoline and lighter materials produced by the conversion reaction and will also include materials of gas oil nature generated by the treatment of the heavy oil in the presence of the contact mass.

In passing it may be noted that the contact masses so utilized partake of the nature of natural or synthetic clays and may comprise natural clays such as fuller's earth, activated clays and synthetic compositions of alumina and/or silica with or without related materials produced by any of numerous known means, and may take the form of granules, formed pellets, beads and the like. Such materials may themselves be catalytic to the desired reaction or may be impregnated with or act as carriers or supports for other materials such as certain metallic oxides and the like, which are catalytic or whose presence is desired for the purpose of the reaction.

Within the broad limits of the above reaction method, it has been found that with some stocks, particularly those stocks of long boiling range, comprising both materials vaporous below the desired reaction temperature and a substantial fraction of materials boiling above the desired reaction temperature, it frequently becomes desirable to subject the lower boiling portions or vaporous portions of the charge to somewhat different conditions of time and temperature than appear to be best for the heavier or non-vaporous portions of the charge.

Accordingly, it is an object of this invention to provide a method of treating materials of long boiling range having substantial fractions boiling above the desired reaction temperature in a manner such as to produce optimum conversion conditions for the several portions of the charge in a manner hereinafter explained.

The method of operation with which this invention in concerned may be understood most readily by reference to the drawing attached hereto, the single figure of which sets forth a diagramatic representation of my operation. In this drawing 1 is a reactor containing a continuous, substantially compact column of particle form solid contact mass material 2, and 3 is a regenerator of generally similar nature. Elevator 4 conveys spent contact mass to storage hopper 5 above regenerator 3 and regenerated contact mass material is conveyed by elevator 6 to storage hopper 7 above reactor 1. The above described process of operation is that commercially known as the "TCC process" and is set forth particularly in patents of Thomas P. Simpson and associates, such as Simpson, Payne, Crowley Patent No. 2,320,318. Charge oil comprising a long boiling range material containing materials boiling both above and below the desired reaction temperature, is brought to the system through pipe 8 and is forced by pump 9 through the coils in furnace 10 wherein it is heated to a temperature near the desired reaction temperature and sufficient to secure separation of the charge into a predetermined vapor portion and a liquid portion. After being heated, it may be discharged through pipe 11 into a distributor 12 placed within contact mass column 2 and located at a point intermediate the ends of that column. The oil being heated to a temperature sufficient to insure that the desired portion of it is in vapor form, separation of vapor from liquid takes place and the vaporous portion of the charge oil passes upwardly through that portion of contact mass column 2 lying above distributor 12 and is therein converted. The liquid portion of the charge, becoming admixed with the down moving contact mass in column 2 is deposited thereon and proceeds downwardly through that portion of column 2 below distributor 12, therein to be converted into vaporous products of conversion and a solid carbonaceous deposit laid down up the contact mass. This liquid material will be here largely converted into gasoline-like material, material of gas oil boiling range vaporous at the reaction temperature obtaining in column 2 below inlet 12, and into gas and the above mentioned cokey deposit. The vaporous products of this phase of the conversion are removed from the contact mass column by collector 13, and are passed by pipe 14 into fractionator 15.

Vaporous products of reaction are removed from the top of the column 2 by pipe 16 and pass through that pipe into fractionator 15, there to be separated into an overhead cut of gasoline and lighter materials passing through pipe 17, condenser 18, and gas separator 19 with non-condensed light material being withdrawn through pipe 20 to gas recovery or further processing, with gasoline being withdrawn through pipe 21 and a portion returned through pipe 22 for fractionator control. A side stream of material boiling above gasoline may be taken at 23, if desired, and product of the nature of a recycle stock comprising either all material heavier than gasoline, if the side stream is not taken at 23, or the material boiling above the side stream, if such side stream is taken, is withdrawn at pipe 24 to be removed from the system by pipe 25 or returned to cracking by pipe 26.

Returning for a moment to the charge oil after heating and before its entry to the contact mass column, the process in many cases may be operated more conveniently, particularly when a larger portion of the charge is desired to be vaporized by operating in the following manner.

Instead of passing directly to the column in the reactor through pipe 11, the heated oil is diverted through pipe 27 into vapor separator 28. Vapors therefrom are introduced through pipe 29 and distributor 30 to a point in the column adjacent distributor 12 and liquid material from 28 is passed through pipe 31 into pipe 11 and distributor 12.

Turning to the bottom of the contact mass column 2, a purging medium such as steam or other inert gas is introduced into the bottom of the reactor through pipe 32 and distributor 33 for purposes of insuring that no volatile hydrocarbon material shall escape with the spent contact mass being removed from the reactor. Spent contact mass passing through elevator 4 in hopper 5 into regenerator 3 is contacted in regenerator 3 with air for the purpose of burning off the combustible contaminant material deposited upon it. This regeneration air or other suitable oxidizing medium is introduced through the agency of manifold 34 and pipes 35, regeneration fumes being removed through pipes 36 and manifold 37. Temperature control of the regenerator may be had in known manner by fluid heat transfer medium introduced into the regenerator in appropriate cooling coils of indirect heat transfer as shown at 38. A purge gas, if desired, may be introduced near the exit end of the regenerator, as by pipe 39. The hot regenerated contact mass material withdrawn from the regenerator in heated condition is delivered through elevator 6, hopper 7 and feed pipe 40 into the top of the reaction column. The temperature of this material and its quantity together with the temperature of the incoming charge stock are balanced so as to provide a desired amount of heat from both sources to maintain the desired reaction temperature levels within reaction column 2.

This process provides a method whereby stocks having a substantial portion, or even all, boiling above the temperature of reaction, which as is customary in the art, may range between about 800° F. and about 1000° F. can be handled in the presence of a solid compact column of a particle form solid contact mass catalytic to the desired reaction. Not only is it applicable to crude residues, but also to distillate stocks of long boiling range having a large portion boiling above 840–850° F., such as vacuum gas oil from Mid Continent or Coastal crudes, or the like.

As is customary in the art, the reaction temperature will be of the same nature as those usually applied, ranging from about 800° F. and 850° F. upwards to temperatures of the order of 950° F. to 1000° F. Catalyst to oil ratios will be of the order of 1 to 6 parts of catalyst by weight to one part of oil. Space velocities, i. e., cubic feet of liquid oil charged (as liquid at 60° F.) per cubic foot of space occupied by catalyst, per hour, will be of the order of 0.5 to 2.0. In general, it is desirable to work at the lower catalyst to oil ratios, for it is known that as this ratio increases, a greater loss to gas and coke is experienced, although the magnitude of these figures is dependent upon catalyst activity, space velocity, and temperature.

In connection with the temperature of materials leaving the furnace 10, particularly when the vapor separator 26 is used it should be pointed out that it is a well known fact that vapor lines handling heavy hydrocarbons at temperatures above about 840–850° F. tend to coke rapidly, therefore this temperature becomes a practical operating limit particularly when vapor separation is made outside of the contact mass column.

This method is particularly applicable to residual stocks from crude distillation, to vacuum gas oils, and to gas oils having a long heavy end. While such oils are usually analytically distilled under vacuum, it is usual to correct the vapor temperature vs. percent received in such analyses to atmospheric basis. Such corrected analytical data are used herein. When an oil is referred to as "having 25% boiling below 950° F.," that means that when 25% of the charge has been received in an analytical distillation, the vapor temperature, reduced to atmospheric pressure, is 950° F., and similarly.

This process is useful with such charge stocks as vacuum gas oils, having 60% or so boiling above 800° F. with such oils, heating to 800° F. or 850° F. in a pipe still under the usual small back pressure does not permit of substantial vaporization, and when such oils are discharged into a reactor operating at 850° F. to 900° F. and usual reactor pressures, a substantial portion of the oil is deposited upon the catalyst as liquid.

The process is most useful for handling residual stocks from distillation of crudes for gas oils, lubricating stocks, and the like. Such oils usually do not have over 25% or so boiling below 900° F., and, obviously, even if heated to a high reaction temperature of the order of 975° F. would still remain largely unvaporized, while heating to such a temperature would produce some undesirable thermally cracked gasoline.

Operating in this fashion, I am able to obtain certain very desirable advantages. First, the lower boiling and sometimes more refractory portion of the charge may be subjected alone, in the upper portion of the reactor to conditions of space velocity, temperature and catalyst/oil ratio most suited for it alone without adjusting these to take into account the presence of any other hydrocarbon material. Additionally, this stock is contacted with the contact mass of highest temperature. Next, the liquid material, may be subjected, alone, to conditions appropriate to the conversion desirable for it. This will require lower temperature than will the lighter material, and normally will require greater catalyst/oil ratio. Even though conducting both operations in the same column, a very wide latitude of control may be gotten by varying the relative amount of the charge vaporized upon entry to the contact mass, and the point of introduction into the contact mass column. All other things being equal, introduction at a higher level for both oil and vapor increases space velocity for vapor and decreases it for oil. Or, while the two are introduced at the same level as before, the depth of bed above that level may be reduced, thus maintaining space velocity for oil and increasing it for vapors. Again, with reactors being equipped for optional introduction at several levels, the distributors 12 and 30, while still intermediate the ends of column 2 and maintained in relative lower and upper position, need not be adjacent, but may be spaced apart.

Also, this method of operation is advantageous when contrasted with one wherein the vapors produced in the bottom of the column pass upward and are taken out at the top of column. In the present case, these vapors, passing downwardly in company with the contact mass upon which liquid residue is being reduced to solid deposit, may assist in that operation by virtue of their carrying power.

Not the least of the advantages of this method of operation over methods wherein all vaporous products of conversion are taken out of the reactor column at one point, either top or bottom, is that with the presently disclosed method the oil charge capacity of a given column of contact mass material is substantially increased because, per barrel of oil charged per hour, the amount of vapors passing through the contact mass at any point in the column is materially lessened.

I claim:

1. The method of converting a heavy, high boiling hydrocarbon oil into high quality gasoline by catalytic cracking in the presence of a particle-form solid catalytic contact mass which comprises circulating said contact mass in a closed cyclic path through an enclosed conversion zone and an enclosed regenerating zone, moving said contact mass through said conversion zone in the form of a substantially compact column, heating a charge oil containing a substantial fraction boiling above the desired reaction temperature to a temperature not higher than said reaction temperature, discharging said oil in said heated condition into said column at a point intermediate the ends thereof to be converted therein, moving vaporous portions of the charge upwardly through that portion of the column above said point of introduction and removing vaporous products of this conversion step from the upper end of said column, moving liquid portions of the charge downwardly through that portion of the column below said introduction point, removing vaporous products of this second conversion step from a point adjacent the bottom of the column, removing contaminated contact mass from the bottom of said conversion zone while substantially preventing escape of vaporous hydrocarbon material therewith, subjecting the contaminated contact mass to a combustion regeneration at high temperature, removing the contact mass from regeneration and introducing it in heated condition into said conversion zone while substantially preventing the escape of combustion gases into said conversion zone, the heat in the said contact mass and the temperature of the charge oil being proportioned to maintain the conversion zone at a desired reaction temperature between about 800° F. and about 1000° F. and not above the boiling point of said substantial fraction of the charge oil.

2. The method of claim 1 in which the charge oil is one having not over about 40% boiling below 800° F.

3. The method of claim 1 in which the charge oil is one having not over about 25% boiling below 900° F.

4. The method of converting a heavy, high boiling hydrocarbon oil into high quality gasoline by catalytic cracking in the presence of a particle form solid catalytic contact mass which comprises circulating said contact mass in a closed cyclic path through an enclosed conversion zone and an enclosed regenerating zone, moving said contact mass through said conversion zone in the form of a substantially compact column, heating a charge oil containing a substantial fraction boiling above the desired reaction temperature to a temperature not above about 840° F., separating said charge oil into a vapor portion and a liquid portion, introducing said vapor and said liquid separately to spaced-apart points in said column intermediate its ends, contacting the vapors so separated with the contact mass in the upper portion of said column in the absence of unvaporized portions of the charge oil, removing vaporous products of this conversion step from the upper end of said column, contacting liquid so separated in a lower portion of the column and below said upper portion of the column wherein vapors are treated, removing vaporous products of this second conversion from a point near the bottom of said column, removing contaminated contact mass from the bottom of said conversion zone while substantially preventing the escape of vaporous hydrocarbon material therewith, subjecting the contaminated contact mass to a combustion regeneration at high temperature, removing the contact mass from regeneration and introducing it in heated condition into said conversion zone while substantially preventing escape of combustion gases into said conversion zone, the heat in the said contact mass and the temperature of the charge vapors and charge liquid being proportioned to maintain the conversion zone at a desired reaction temperature between about 800° F. and about 1000° F. and not above the boiling point of said substantial fraction of the charge oil.

SYLVANDER C. EASTWOOD.

REFERENCES CITED

The following references are of record in the file of this patent:

UNITED STATES PATENTS

| Number | Name | Date |
| --- | --- | --- |
| 2,348,699 | Tuttle | May 9, 1944 |
| 2,356,611 | Peters | Aug. 22, 1944 |
| 2,357,136 | Rubin | Aug. 29, 1944 |
| 2,372,018 | Ruthruff | Mar. 20, 1945 |
| 2,387,378 | Wolk | Oct. 23, 1945 |